United States Patent
Yang et al.

(10) Patent No.: US 12,354,494 B1
(45) Date of Patent: Jul. 8, 2025

(54) BIOLOGICAL AVAILABILITY TESTING DEVICE FOR SIMULATING A STRUCTURE OF A RESPIRATORY SYSTEM

(71) Applicant: GUANGDONG UNIVERSITY OF TECHNOLOGY, Guangzhou (CN)

(72) Inventors: Yan Yang, Guangzhou (CN); Haojia Chen, Guangzhou (CN); Zhiqin Liang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/023,993

(22) Filed: Jan. 16, 2025

(30) Foreign Application Priority Data

Sep. 11, 2024 (CN) .......................... 202411266670.8

(51) Int. Cl.
*G09B 23/28* (2006.01)
(52) U.S. Cl.
CPC .................................. *G09B 23/288* (2013.01)
(58) Field of Classification Search
CPC .................................................... G09B 23/288
USPC ......................................................... 73/866.4
See application file for complete search history.

(56) References Cited

U.S. PATENT DOCUMENTS

| | | | |
|---|---|---|---|
| 2012/0247235 A1 | 10/2012 | Adamo et al. | |
| 2016/0217709 A1* | 7/2016 | Minskoff | G09B 23/30 |
| 2023/0002714 A1* | 1/2023 | Cho | C12N 5/0688 |

FOREIGN PATENT DOCUMENTS

| | | | | |
|---|---|---|---|---|
| CN | 112179819 A | * | 1/2021 | ............ G01N 15/04 |
| CN | 115235956 A | | 10/2022 | |
| CN | 115753534 A | | 3/2023 | |
| CN | 118571112 A | | 8/2024 | |
| WO | 2020217259 A1 | | 10/2020 | |

OTHER PUBLICATIONS

Hu et al. Machine translation of CN112179819A. Published Jan. 2021. Accessed Apr. 2025. (Year: 2021).*
Min JI et al., "Teaching experiment on lung compliance by respiratory physical model", Physics Experimentation, vol. 34, No. 1, Jan. 20, 2014, pp. 22-26.

* cited by examiner

*Primary Examiner* — Walter L Lindsay, Jr.
*Assistant Examiner* — Philip T Fadul

(57) ABSTRACT

A biological availability testing device for simulating a structure of a respiratory system, wherein, including a respiratory pump, a diaphragm, a lung model, alveolar components, an upper respiratory tract, an inhalation component, a mucus replenishment device, a vibration cleaning device, a sealed chamber, a temperature controller of respiratory, a temperature controller of lung. The diaphragm is provided with a one-way valve, the sealed chamber is divided into an upper region and a lower region by the diaphragm. The lung model is connected to the alveolar components, and the lung model and alveolar components are located in the upper region of the sealed chamber. A lung fluid injection/an extraction port of the alveolar component is connected to the sealed chamber. The biological availability testing device has simulated the anatomical structure and physiological functions of the human respiratory system more realistic, and has improved the accuracy and reliability of test results.

7 Claims, 7 Drawing Sheets

US 12,354,494 B1

Figure 1:
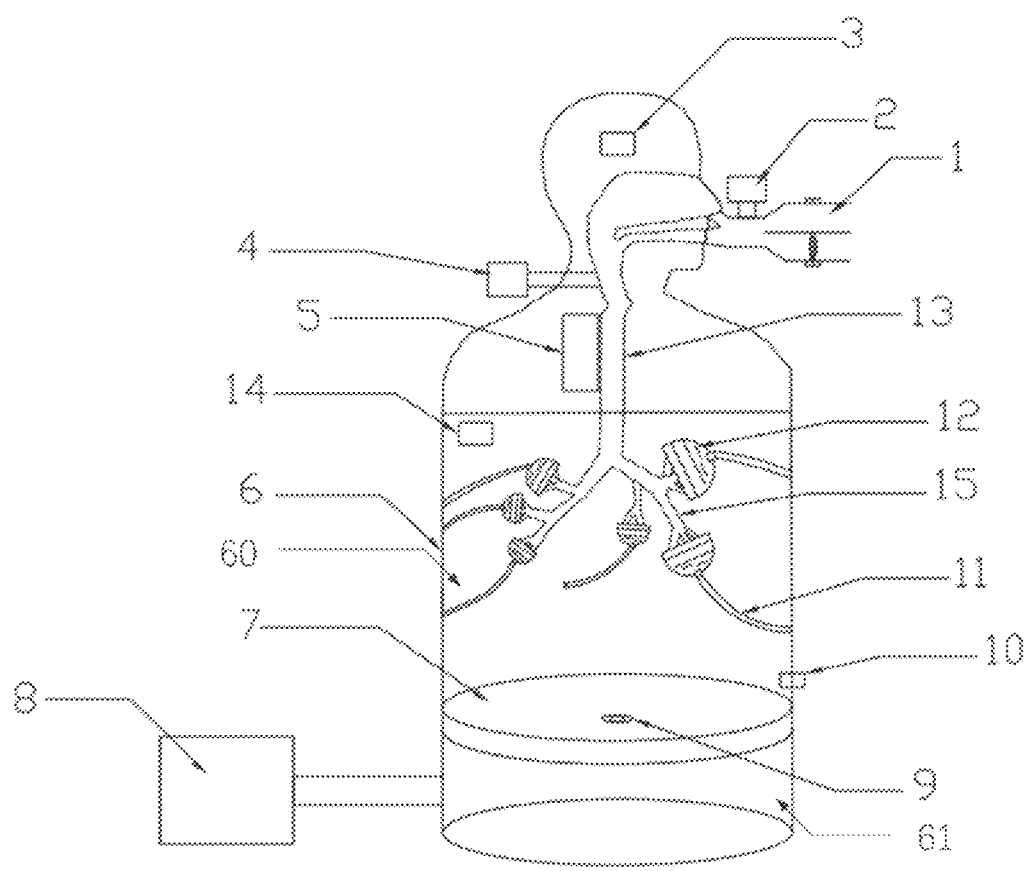

BIOLOGICAL AVAILABILITY TESTING DEVICE FOR SIMULATING A STRUCTURE OF A RESPIRATORY SYSTEM

CROSS REFERENCE TO RELATED APPLICATIONS

This application claims foreign priority of Chinese Patent Application No. 202411266670.8, filed on Sep. 11, 2024 in the China National Intellectual Property Administration, the disclosures of all of which are hereby incorporated by reference.

TECHNICAL FIELD

The present disclosure relates to the technical field ecological environmental science simulation testing technology, in particular to a biological availability testing device for simulating a structure of a respiratory system.

BACKGROUND

With the deepening of environmental science research and the growing understanding of bioavailability parameters, there are certain limitations in human and animal experiments for risk exposure assessment. To overcome these limitations, some simulation devices have been developed in existing technologies. Although current simulation devices have addressed some of the limitations of human and animal testing to some extent, they still have several shortcomings.

Firstly, existing simulation devices often cannot directly collect environmental samples, which limits their application in real-world environments. Secondly, existing simulation devices may not fully incorporate the entire respiratory structure, which could lead to deviations between the simulation results and actual conditions. These limitations mean that current models may not accurately simulate the process of pollutants entering the human body in a real environmental setting, thus affecting the accuracy of bioavailability parameter measurements.

To overcome the above-mentioned limitations of existing technologies, this disclosure provides an improved biological availability testing device. The device directly collects environmental samples and is specifically used for evaluating bioavailability/bioeffectiveness parameters through the environmental respiratory pathway.

SUMMARY

The present disclosure provides a biological availability testing device for simulating a structure of respiratory system, to solve the technical problem that existed in the prior arts.

To realize the above objective, the present disclosure provides a biological availability testing device for simulating a structure of a respiratory system, including: a respiratory pump, a diaphragm, a lung model, alveolar components, an upper respiratory tract, an inhalation component, a mucus replenishment device, a vibration cleaning device, a sealed chamber, a temperature controller of respiratory, and a temperature controller of lung; the diaphragm is provided with a one-way valve, and the sealed chamber is divided into an upper region and a lower region by the diaphragm; and the lung model is connected to the alveolar components, and the lung model and alveolar components are located in the upper region of the sealed chamber; and a lung fluid injection/extraction connection pipeline of the alveolar components is connected to a sidewall of the sealed chamber; and the upper respiratory tract is communicated with the lung model and connected to the inhalation components; and the respiratory pump is communicated with the lower region of the sealed chamber; and a structure of the temperature controller of respiratory is the same with that of the temperature controller of lung, comprising a heating element, a humidifier, a temperature and humidity sensor, and a control circuit; the temperature controller of respiratory and the temperature controller of lung are configured to adjust a temperature and a humidity within a respiratory tract according to environmental parameters and a circadian rhythm of a human body, to maintain a simulated human respiratory environment; wherein the upper respiratory tract comprises two working stages: an inhalation-only stage and a breathing simulation stage, wherein the respiratory pump is configured to perform an inhalation process, and a one-way valve is opened during the inhalation-only stage; the one-way valve is closed in the breathing simulation stage, and the respiratory pump is configured to change an air pressure of the lower region, to alter a lung pressure to simulate breathing.

Furthermore, the upper respiratory tract is provided a double layer structure: a smooth layer and a porous material layer, an outer layer is the smooth layer, and an inner layer is the porous material layer; upper respiratory tract is configured to adhere and evenly distribute mucus.

Furthermore, the vibration cleaning device is configured to remove adhered particulate matters.

Furthermore, each alveolar component comprises a porous upper end cap, a sealing ring, a breathable partition, a porous lower end cap, a lung fluid loading area, a lung fluid inlet and outlet pipe, an alveolar duct, a connecting tube of lung, a spherical connection part, and a catheter.

Furthermore, a structure of the inhalation component is a four channel structure, and two channels of the inhalation component are configured to link nasal and oral cavities, and other two channels of the inhalation component is configured to serve as a main channel and an auxiliary channel respectively; and the main channel is equipped with a particle concentration detector and a flowmeter, and the auxiliary channel is equipped with a filter membrane to collect samples.

Furthermore, the biological availability testing device further comprises a temperature and humidity sensor, configured to monitor values of temperature and humidity in real-time; and a central control system, configured to receive data from the temperature and humidity sensor, and adaptively adjust the values of the temperature and humidity based on preset conditions or real-time data; and an adaptive adjustment mechanism, which comprises a heating portion, a cooling portion, a humidifying portion, and a dehumidifying portion; wherein the adaptive adjustment mechanism is configured to adjust the values of temperature and humidity inside the biological bioavailability testing device according to commands from the central control system; the adaptive adjustment mechanism is also configured to simulate diurnal and seasonal temperature and humidity variation curves to replicate the conditions of a human respiratory tract under different times and environmental settings.

The present disclosure further provides a control method for a biological availability testing device for simulating a structure of a respiratory system, applied to the biological availability testing device for simulating the structure of the respiratory system, 7 comprising the following steps: acquiring real-time environmental parameters inside the biological availability testing device during a preset time period, and performing a feature extraction on the each real-time environmental parameters to obtain parameter features of each real-time environmental parameters, wherein the environmental parameters comprise values of temperature and humidity; and calculating Laplace scores between the parameter features and preset features, and selecting the parameter features with corresponding Laplace score greater than a preset score as a root node; and performing a splitting process on the root nodes based on the parameter features of each real-time environmental parameters to obtain several leaf nodes; after the splitting process, obtaining feature information gain for each leaf node, and comparing the feature information gain of each leaf node with a preset threshold value; if the feature information gain of any leaf nodes is not greater than the preset threshold, the splitting process continues; and stopping the splitting process when the feature information gain of all of the leaf nodes is greater than the preset threshold, assigning each real-time environmental parameter to a corresponding leaf node to obtain several initial clusters, and evaluating and adjusting the initial clusters to obtain a final clustering result; and constructing a Markov model and training the Markov model to obtain a trained Markov model, then importing the final clustering result into the trained Markov model for prediction to obtain a predicted dynamic variation trend of environmental parameters inside the biological availability testing device for a future time period.

Furthermore, control method also comprises the following steps: constructing a preset dynamic variation curve of the environmental parameters inside the biological availability testing device during a testing process according to preset human circadian rhythmic humidity test requirements; and constructing a predicted dynamic variation curve of the environmental parameters inside the biological availability testing device for a future time period based on the predicted dynamic variation trend; and calculating an overlap degree between the preset dynamic variation curve and the predicted dynamic variation curve using an Euclidean distance algorithm, and determining whether the overlap degree is greater than a preset overlap degree; and if the overlap degree is greater than the preset overlap degree, no control is performed on a temperature controller of respiratory and a temperature controller of lung; and if the overlap degree is not greater than the preset overlap degree, importing the predicted dynamic variation curve into the pre-constructed knowledge graph for pairing, to obtain a control scheme; controlling the temperature controller of respiratory and the temperature controller of lung based on the control scheme.

By setting up the respiratory pump, the diaphragm, the lung model, the alveolar components, the upper respiratory tract, the inhalation component, the anatomical structure and physiological functions of the human respiratory system are more realistically simulated, improving the accuracy and reliability of test results. The addition of the mucus replenishment device and the self-vibration cleaning device simulates the secretion and clearance of mucus in the human respiratory tract, bringing the test conditions closer to real-life scenarios. The double-layer structure of the upper respiratory tract better simulates the adhesion and distribution of mucus within the respiratory tract. The porous structure and pulmonary liquid loading area in the alveolar parts facilitate the measurement of pollutants entering the pulmonary liquid. The inclusion of functions such as particle concentration detection, flow meter, and filter membrane sampling in the inhalation components allows for comprehensive monitoring and collection of the physicochemical and biological properties of inhaled substances. By incorporating temperature controller and temperature controller of respiratory in the upper respiratory tract and lung model, the environmental parameters of the human respiratory tract can be adaptively adjusted, making the test conditions closer to physiological states.

BRIEF DESCRIPTION OF THE DRAWINGS

In order to more clearly illustrate the technical solutions in the embodiments of the present disclosure or the prior art, a brief introduction to the drawings used in the descriptions of the embodiments or prior art is provided below. It is evident that the drawings described below are merely some embodiments of the present disclosure. For those skilled in the art, without making any effective efforts, other drawings of different embodiments can be derived from these drawings.

FIG. 1 is a schematic structural diagram of a biological availability testing device for simulating a structure of a respiratory system according to an embodiment of the present disclosure.

FIG. 2 is a schematic structural diagram of an alveolar component of the biological availability testing device for simulating the structure of the respiratory system according to an embodiment of the present disclosure.

FIG. 3 is a first exploded diagram of the alveolar component in FIG. 2.

FIG. 4 is is a schematic structural diagram of an alveolar duct of the biological availability testing device for simulating the structure of the respiratory system according to an embodiment of the present disclosure.

FIG. 5 is a schematic structural diagram of a double layer structure of a respiratory tract of the biological availability testing device for simulating the structure of the respiratory system according to an embodiment of the present disclosure.

FIG. 6 is a flowchart of a control method for a biological availability testing device for simulating a structure of a respiratory system according to an embodiment of the present disclosure.

FIG. 7 is a detailed flowchart of a control method for a biological availability testing device for simulating a structure of a respiratory system according to an embodiment of the present disclosure.

FIG. 8 is a diagram of a control equipment for the biological availability testing device for simulating the structure of a respiratory system.

DESCRIPTION OF THE REFERENCE NUMERAL

1 inhalation component, 2 humidifier, 3 temperature controller of respiratory, 4 mucus replenishment device, 5 vibration cleaning device, 6 sealed chamber, 60 upper region, 61 lower region, 7 diaphragm, 8 respiratory pump, 9 one-way valve, 10 exhaust gas collecting port, 11 lung fluid injection/extraction connection pipeline, 12 alveolar component, 13 upper respiratory tract, 14 temperature controller of lung, 15 lung model, 1201 alveolar duct, 1202 porous upper end cap, 1203 connecting part, 1204 sealed ring, 1205 breathable partition, 1206 porous lower end cap, 1207 lung fluid loading area, 1301 connecting tube of lung, 1302 porous material layer of the respiratory tract, 12011 connecting pipe, 12012 spherical connecting part, 12013 catheter.

DETAILED DESCRIPTION OF THE EMBODIMENTS

In order to better understand the aforementioned objectives, features, and advantages of the present disclosure, a more detailed description of the disclosure is provided below, in conjunction with the accompanying drawings and specific embodiments. These drawings are simplified schematic diagrams, which illustrate the basic structure of the present disclosure in a schematic manner and only display the relevant components related to the disclosure. It should be noted that, when there is no conflict, the embodiments and features within the embodiments in this application can be combined with each other.

In the description of this application, it should be understood that the terms "center", "longitudinal", "lateral", "up", "down", "front", "back", "left", "right", "vertical", "horizontal", "top", "bottom", "inside", "outside", and other directional or positional relationships are based on the orientations or positional relationships shown in the accompanying drawings. These terms are merely for the convenience of describing the application and simplifying the description, and do not indicate or imply that the device or component must have a specific orientation or be constructed and operated in a specific orientation. Therefore, they should not be interpreted as limitations on the scope of protection of this application. In addition, the terms "first", "second", and so on are used only for descriptive purposes and should not be interpreted as indicating or implying relative importance or the number of technical features indicated. Therefore, features described with "first", "second", and similar terms may explicitly or implicitly include one or more of those features. In the description of the present disclosure, unless otherwise specified, the term "plurality" means two or more.

In the description of this disclosure, it should be noted that, unless explicitly defined otherwise, terms such as "install", "connected", and "coupled" should be broadly understood. For example, they could refer to a fixed connection, a detachable connection, or an integrated connection; a mechanical connection or an electrical connection; a direct connection or an indirect connection through an intermediary; or communication within two components. For those skilled in the art, the specific meaning of these terms in this application can be understood based on the specific circumstances.

For ease of understanding, the present disclosure will be described more comprehensively below with reference to the relevant drawings. The drawings provide an optimal embodiment of the present disclosure. However, the disclosure can be implemented in many different forms and is not limited to the embodiments described herein. On the contrary, the purpose of providing these embodiments is to facilitate a more thorough and comprehensive understanding of the disclosure of the present disclosure.

The present disclosure provides a biological availability testing device for simulating a structure of a respiratory system. Referring to FIG. 1, the biological availability testing device for simulating the structure of the respiratory system includes: a respiratory pump 8, a diaphragm 7, a lung model 15, alveolar components 12, an upper respiratory tract 13, an inhalation component 1, a mucus replenishment device 4, a vibration cleaning device 5, a sealed chamber 6, a temperature controller of respiratory 3, and a temperature controller of lung 4.

The diaphragm 7 is provided with a one-way valve 9, and the sealed chamber 6 is divided into an upper region 60 and a lower region 61 by the diaphragm 7.

The lung model 15 is connected to the alveolar components 12, and the lung model 15 and alveolar components 12 are located in the upper region 60 of the sealed chamber 6.

A lung fluid injection/extraction connection pipeline 11 of the alveolar components 12 is connected to a sidewall of the sealed chamber 6.

The upper respiratory tract 13 is communicated with the lung model 15 and connected to the inhalation components 12.

The respiratory pump 8 is communicated with the lower region 61 of the sealed chamber 6.

A structure of the temperature controller of respiratory 3 is the same with that of the temperature controller of lung 14, including a heating element, a humidifier, a temperature and humidity sensor, and a control circuit. The temperature controller of respiratory 3 and the temperature controller of lung 14 are configured to adjust a temperature and a humidity within a respiratory tract according to environmental parameters and a circadian rhythm of a human body, to maintain a simulated human respiratory environment.

The upper respiratory tract 13 comprises two working stages: an inhalation-only stage and a breathing simulation stage. The respiratory pump is configured to perform an inhalation process, and a one-way valve 9 is opened during the inhalation-only stage. External particles enter from the inhalation component 1, pass through the upper respiratory tract 13 and the lung model 15, and then enter the simulated lung fluid in the alveoli. The one-way valve 9 is closed in the breathing simulation stage, and the respiratory pump 8 is configured to change an air pressure of the lower region, to alter a lung pressure to simulate breathing. The one-way valve 9 is closed, and the respiratory pump 8 changes the air pressure of the lower region 61 of the sealed chamber 6, thereby changing the lung air pressure to simulate breathing.

The biological availability testing device is also equipped with a temperature and humidity sensor, a central control system, and an adaptive adjustment mechanism. The temperature and humidity sensor is configured to monitor values of temperature and humidity in real-time. The central control system is configured to receive data from the temperature and humidity sensor, and adaptively adjust the values of the temperature and humidity based on preset conditions or real-time data. The adaptive adjustment mechanism comprises a heating portion, a cooling portion, a humidifying portion, and a dehumidifying portion. The adaptive adjustment mechanism is configured to adjust the values of temperature and humidity inside the biological bioavailability testing device according to commands from the central control system. The adaptive adjustment mechanism is also configured to simulate diurnal and seasonal temperature and humidity variation curves to replicate the conditions of the human respiratory tract under different times and environmental settings.

Figure 5:
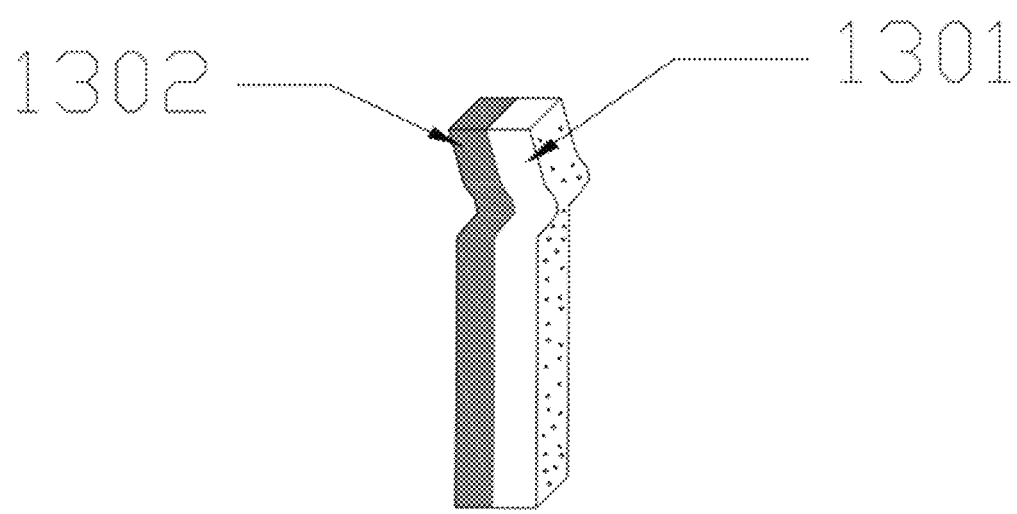

In another embodiment, as shown in FIG. 5, the upper respiratory tract 13 has a double layer structure: a smooth layer 1301 and a porous material layer 1302, an outer layer is the smooth layer 1301, and an inner layer is the porous material layer 1302. The double layer structure is configured to adhere and evenly distribute mucus.

In another embodiment, mucus replenishment device 4 is provided, and the mucus replenishment device 4 configured to periodically replenish mucus to maintain an integrity of a mucus layer.

In another embodiment, a vibration cleaning device 5 is provided, and the vibration cleaning device 5 is configured to remove adhered particulate matters.

It should be noted that during the working stage, the addition of mucus is carried out by the mucus replenishment device 4. During a cleaning stage, the vibration cleaning device 5 can be locally vibrated to remove particles adhered to the mucus through vibration.

Figure 2:
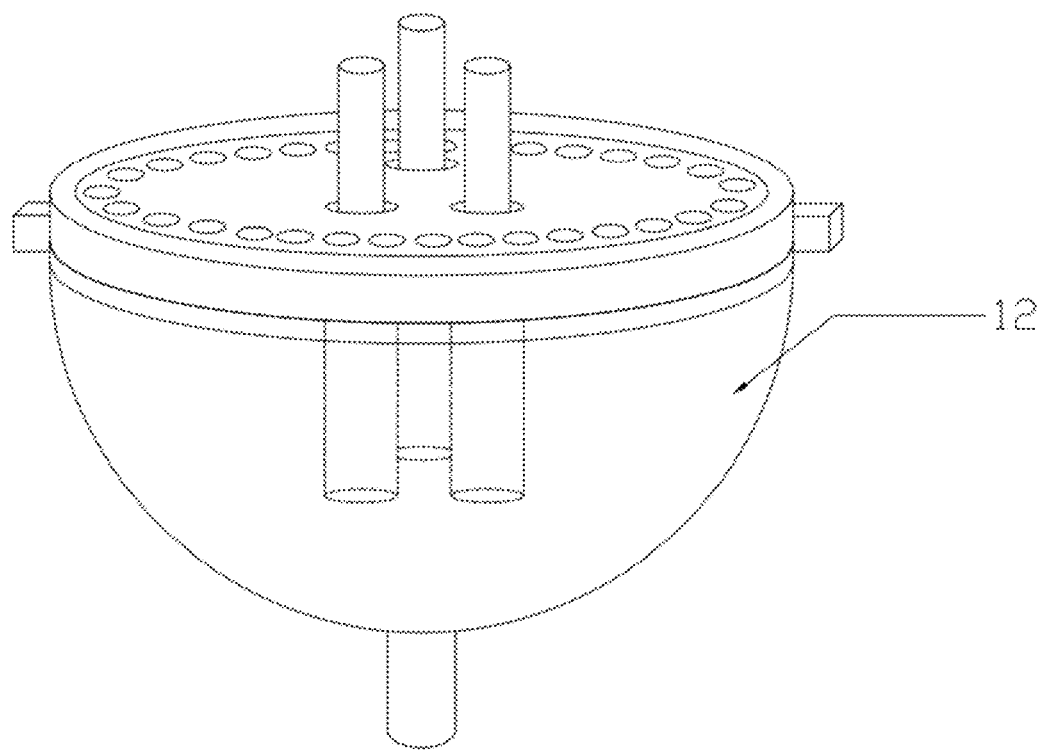
Figure 3:
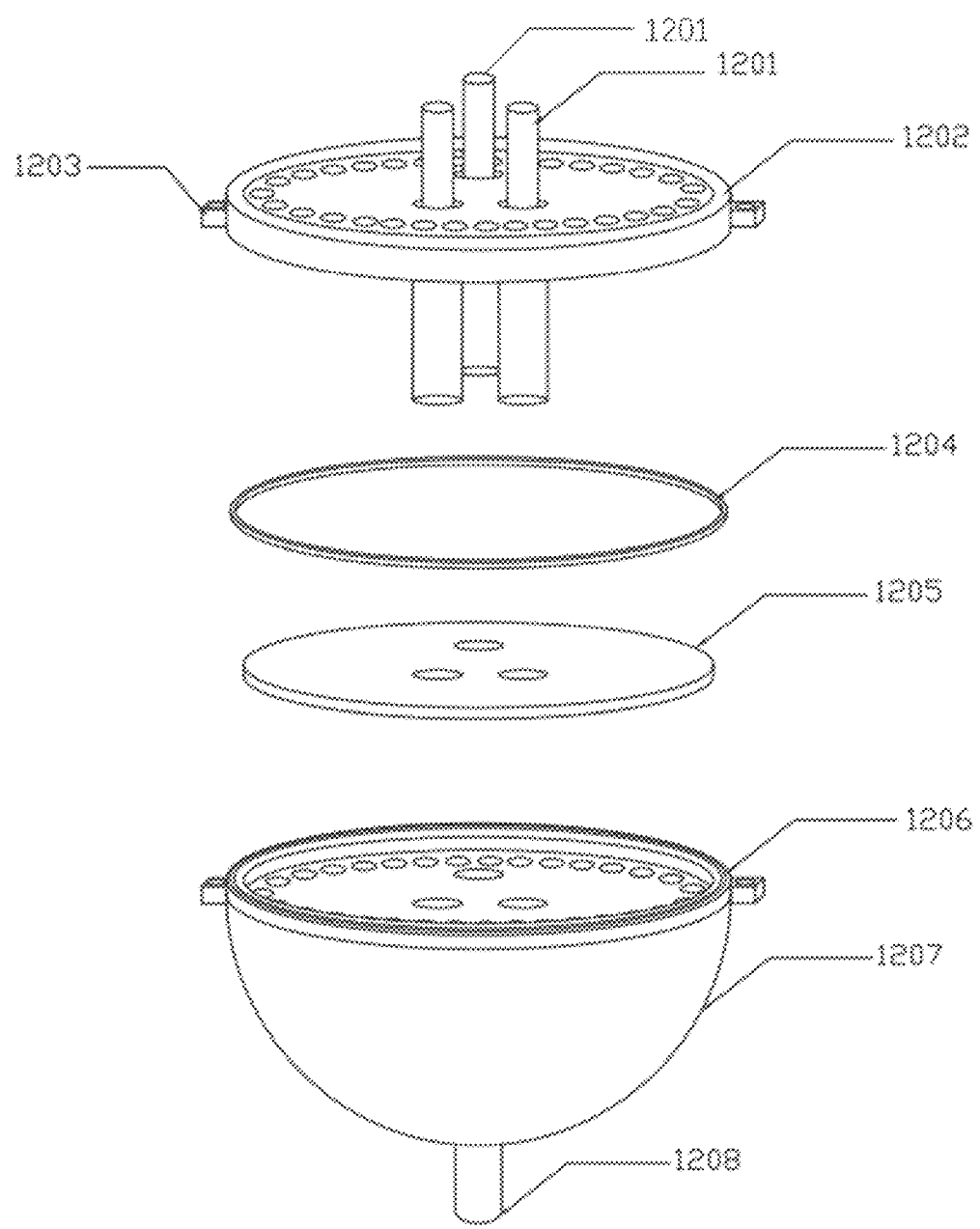
Figure 4:
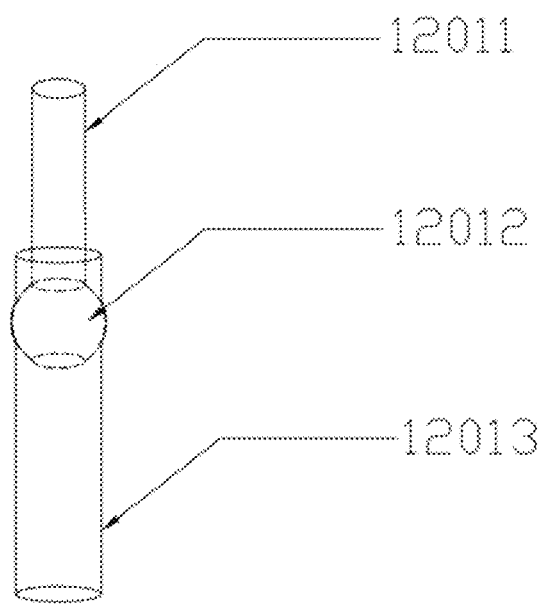

Furthermore, as shown in FIGS. 2 to 4, each alveolar component 12 comprises a porous upper end cap 1202, a sealing ring 1204, a breathable partition 1205, a porous lower end cap 1206, a lung fluid loading area 1207, a lung fluid inlet and outlet pipe, an alveolar ducts 1201, a connecting tube of lung, a spherical connection part 12012, and a catheter 12013. Each alveolar duct 1201 includes a connecting pipe 12011, a spherical connection part 12012, and a catheter 12013.

It should be noted that the alveolar can connect each connecting pipe 12011 of each alveolar duct 1201 from multiple positions, and facilitate the replacement, extraction, and detection of lung fluid during device operation.

In another embodiment, the upper respiratory tract 13 and the lung model 15 are both equipped with temperature control elements, which are configured to regulate the temperature of the upper respiratory tract 13 and the lung model 15.

In another embodiment, the inhalation component 1 has a four channel structure, and two channels of the inhalation component 1 are configured to link nasal and oral cavities, and other two channels of the inhalation component is configured to serve as a main channel and an auxiliary channel respectively; and the main channel is equipped with a particle concentration detector and a flowmeter, and the auxiliary channel is equipped with a filter membrane to collect samples.

Furthermore, the biological availability testing device further comprises a temperature and humidity sensor, a central control system and an adaptive adjustment mechanism. The temperature and humidity sensor is configured to monitor values of temperature and humidity in real-time. The central control system is configured to receive data from the temperature and humidity sensor, and adaptively adjust the values of the temperature and humidity based on preset conditions or real-time data. The adaptive adjustment mechanism comprises a heating portion, a cooling portion, a humidifying portion, and a dehumidifying portion. The adaptive adjustment mechanism is configured to adjust the values of temperature and humidity inside the biological bioavailability testing device according to commands from the central control system. The adaptive adjustment mechanism is also configured to simulate diurnal and seasonal temperature and humidity variation curves to replicate the conditions of the human respiratory tract under different times and environmental settings.

By setting up the respiratory pump, the diaphragm, the lung model, the alveolar components, the upper respiratory tract, the inhalation component, the anatomical structure and physiological functions of the human respiratory system are more realistically simulated, improving the accuracy and reliability of test results. The addition of the mucus replenishment device and the self-vibration cleaning device simulates the secretion and clearance of mucus in the human respiratory tract, bringing the test conditions closer to real-life scenarios. The double-layer structure of the upper respiratory tract better simulates the adhesion and distribution of mucus within the respiratory tract. The porous structure and pulmonary liquid loading area in the alveolar parts facilitate the measurement of pollutants entering the pulmonary liquid. The inclusion of functions such as particle concentration detection, flow meter, and filter membrane sampling in the inhalation components allows for comprehensive monitoring and collection of the physicochemical and biological properties of inhaled substances. By incorporating temperature controller and temperature controller of respiratory in the upper respiratory tract and lung model, the environmental parameters of the human respiratory tract can be adaptively adjusted, making the test conditions closer to physiological states.

The present disclosure also provides a control method for a biological availability testing device for simulating a structure of a respiratory system, applied to the biological availability testing device for simulating the structure of the respiratory system mentioned above.

Figure 6:
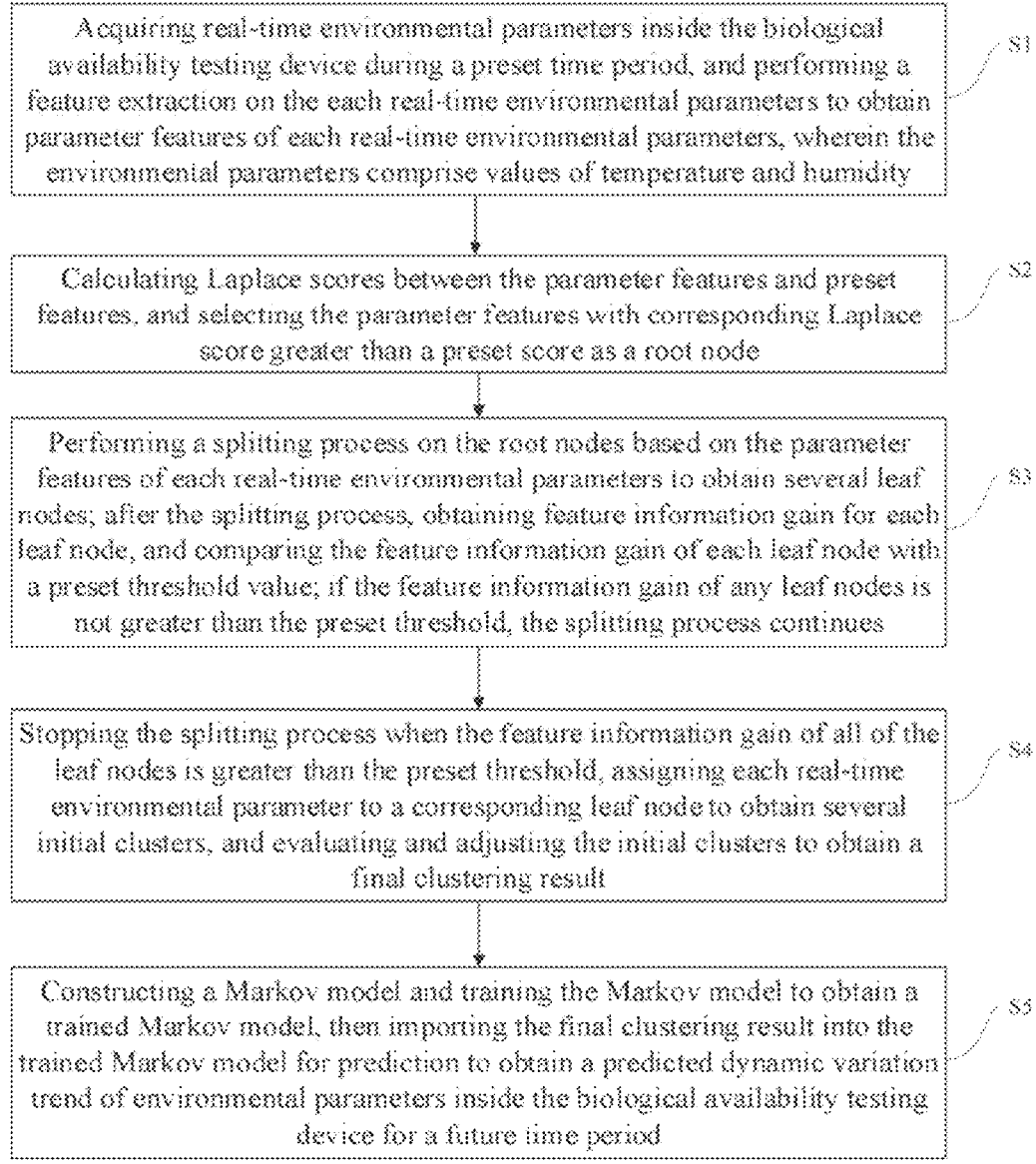

As shown in FIG. 6, the control method includes the following steps.

S1, acquiring real-time environmental parameters inside the biological availability testing device during a preset time period, and performing a feature extraction on the each real-time environmental parameters to obtain parameter features of each real-time environmental parameters, wherein the environmental parameters comprise values of temperature and humidity.

S2, calculating Laplace scores between the parameter features and preset features, and selecting the parameter features with corresponding Laplace score greater than a preset score as a root node.

S3, performing a splitting process on the root nodes based on the parameter features of each real-time environmental parameters to obtain several leaf nodes; after the splitting process, obtaining feature information gain for each leaf node, and comparing the feature information gain of each leaf node with a preset threshold value; if the feature information gain of any leaf nodes is not greater than the preset threshold, the splitting process continues.

S4, Stopping the splitting process when the feature information gain of all of the leaf nodes is greater than the preset threshold, assigning each real-time environmental parameter to a corresponding leaf node to obtain several initial clusters, and evaluating and adjusting the initial clusters to obtain a final clustering result.

S5, constructing a Markov model and training the Markov model to obtain a trained Markov model, then importing the final clustering result into the trained Markov model for prediction to obtain a predicted dynamic variation trend of environmental parameters inside the biological availability testing device for a future time period.

It should be noted that once real-time environmental parameters are obtained, missing value processing, outlier removal, and data normalization can first be applied to achieve more reliable parameters. Then, independent component analysis (ICA) can be used to extract features from the real-time environmental parameters, obtaining the characteristic parameters for each real-time environmental parameter. Afterward, a decision-making algorithm can be used to cluster the collected real-time environmental parameters, resulting in the final clustering outcome. This allows for the identification of parameters such as real-time temperature or real-time humidity. By combining decision trees and the Markov model to predict the short-term environmental trend within the device, the non-linear relationships of environmental parameters can be better captured, adapting to environmental changes and capturing spatiotemporal dependencies. This approach reduces computational complexity, provides clear interpretations, and integrates multi-source data, thereby improving the accuracy and reliability of environmental predictions.

Figure 7:
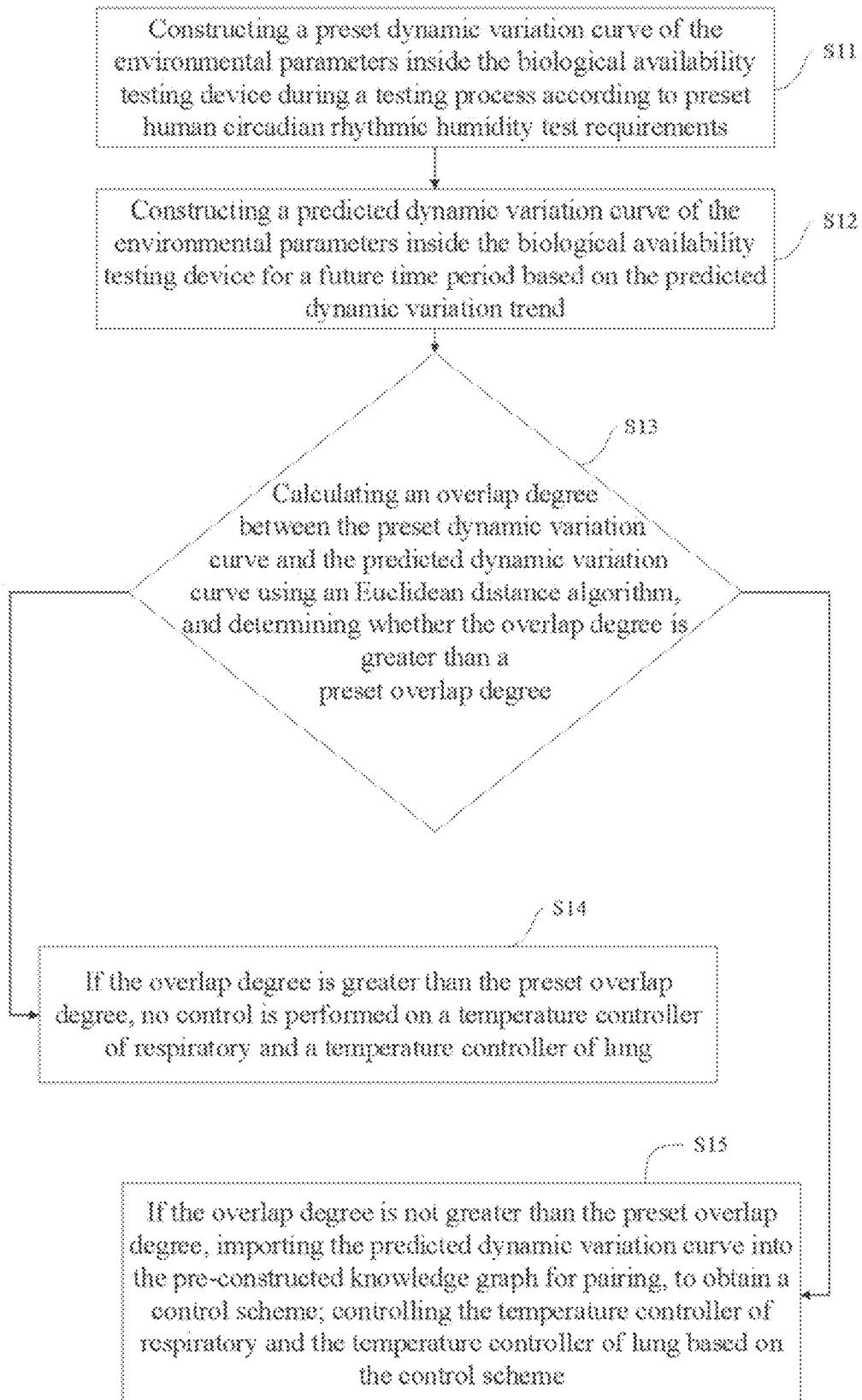

In another embodiment, as shown in FIG. 7, the control method also includes the following steps.

S11, constructing a preset dynamic variation curve of the environmental parameters inside the biological availability testing device during a testing process according to preset human circadian rhythmic humidity test requirements.

S12, constructing a predicted dynamic variation curve of the environmental parameters inside the biological availability testing device for a future time period based on the predicted dynamic variation trend.

S13, calculating an overlap degree between the preset dynamic variation curve and the predicted dynamic variation curve using an Euclidean distance algorithm, and determining whether the overlap degree is greater than a preset overlap degree.

S14, if the overlap degree is greater than the preset overlap degree, no control is performed on a temperature controller of respiratory and a temperature controller of lung.

S15, if the overlap degree is not greater than the preset overlap degree, importing the predicted dynamic variation curve into the pre-constructed knowledge graph for pairing, to obtain a control scheme; controlling the temperature controller of respiratory and the temperature controller of lung based on the control scheme.

It should be noted that through the above intelligent analysis and control algorithms, the short-term environmental change trends can be predicted based on the data collected from temperature and humidity sensors. This allows for preemptive adjustments to the temperature and humidity settings in order to maintain the stability of the simulated respiratory environment inside the biological availability testing device, effectively improving the accuracy of test results, enhancing adaptability, ensuring test safety, and optimizing testing conditions. As a result, the testing effectiveness and reliability of the bioavailability testing device are improved.

In this process, the real-time environmental parameters are allocated to corresponding leaf nodes, resulting in several initial clusters. The initial clusters are then evaluated and corrected to obtain the final clustering result, with the following specific steps. Calculating a Karhunen-Loève index for each initial cluster and comparing the Karhunen-Loève index with a preset value. If the Karhunen-Loève index of the initial cluster is greater than the preset value, no correction is needed for that initial cluster. And if the Karhunen-Loève index of an initial cluster is not greater than the preset value, calculating a cosine distance between each real-time environmental parameter in the initial cluster and a cluster center. Constructing a size ranking table and importing the cosine distances between the real-time environmental parameters and the cluster center into the table. Sorting the table to find a maximum cosine distance, and removing the real-time environmental parameter with the maximum cosine distance from the initial cluster. Recalculating the Karhunen-Loeve index of the initial cluster. If the Karhunen-Loève index is still not greater than the preset value, removing the real-time environmental parameter corresponding to a second-largest cosine distance, and so on, until the Karhunen-Loève index of the initial cluster exceeds the preset value, completing the correction process for that initial cluster.

It should be noted that the Karhunen-Loève index is a clustering evaluation metric that helps assess the quality and effectiveness of clustering results. This index provides an objective evaluation of the initial clustering results, helping to understand the compactness and separation of clusters, and determine the quality of the clustering effect. During the collection of real-time environmental parameters, some noise data points may exist, which can interfere with the clustering results and lead to poor clustering performance. Therefore, by first evaluating the initial clustering results with the Karhunen-Loève index, and if an initial cluster's index is not greater than the preset value, it indicates that the clustering effect of that initial cluster is substandard, with noise data present. At this point, noise data can be filtered out by calculating cosine distances, allowing for more accurate clustering results, improving clustering performance, and helping to enhance the quality and efficiency of data analysis. This provides more reliable and useful information support for decision-making and applications.

The specific steps of constructing a Markov model and training the Markov model to obtain a trained Markov model, then importing the final clustering result into the trained Markov model for prediction to obtain a predicted dynamic variation trend of environmental parameters inside the biological availability testing device for a future time period are as follows.

Constructing the Markov model and determining the set of possible states for the system. The set of the possible states is used to describe the respiratory system's state at different time points, where the set of the possible states represents different environmental conditions or features, including temperature and humidity.

Retrieving the historical operation log of the biological availability testing device. Based on the historical operation log, extracting feature historical data, which includes the actual values of environmental parameters and their corresponding state information.

Based on the feature historical data, calculating the transition probabilities between possible states and constructing a transition matrix of a Markov chain. The transition matrix describes the probability of the respiratory system transitioning between different states.

Training the Markov model based on a maximum likelihood method, using the transition matrix of the Markov chain. The training process adjusts the model parameters to better fit the actual data until the model parameters meet the required standards, resulting in a trained Markov model.

Importing the final clustering results into the trained Markov model and predicting the future dynamic changes in environmental parameters over the upcoming time period through the trained Markov model, based on the current state and transition matrix.

It should be noted that the operating log of the bioavailability testing device is a document that records significant events and operational information during the operation of the bioavailability testing device, including test dates and times, test items and parameters, device operating status, test results, and data.

By using the Markov model to predict the obtain the predicted dynamic variation trend of environmental parameters inside the biological availability testing device for a future time period, the device can adaptively adjust the temperature and humidity within the respiratory tract to maintain the simulated human respiratory environment. This improves the reliability of the device and provides strong support for scientific research and engineering practice.

Additionally, the predicted dynamic variation trend is imported into a pre-built knowledge graph for matching, which leads to the creation of a control scheme. The specific steps are as follows. Obtaining historical dynamic variation trends of the environment parameters at various historical time periods from the historical operation log of the biological availability testing device. Based on these trends, constructing the historical dynamic variation trend.

Pre-preparing the corresponding control schemes for each historical dynamic variation trend and building a knowledge graph. Importing the control schemes for each historical dynamic variation trend into the knowledge graph.

If the overlap degree is not greater than a preset threshold, import the predicted dynamic variation trend into the knowledge graph. Using the Euclidean distance algorithm, calculate the overlap rate between the predicted dynamic variation trend and each historical dynamic variation trend, resulting in multiple overlap rates.

Processing the multiple overlap rates in ascending order to extract the maximum overlap rate. Retrieving the historical dynamic variation trend corresponding to the maximum overlap rate. Generate a matching label based on the historical dynamic variation trend corresponding to the maximum overlap rate. Based on the matching label, using the knowledge graph to match and obtain the control scheme for temperature controller of the respiratory and temperature controller of the lung.

The control method for a biological availability testing device for simulating a structure of a respiratory system is processed by a control equipment for a biological availability testing device for simulating a structure of a respiratory system.

Figure 8:
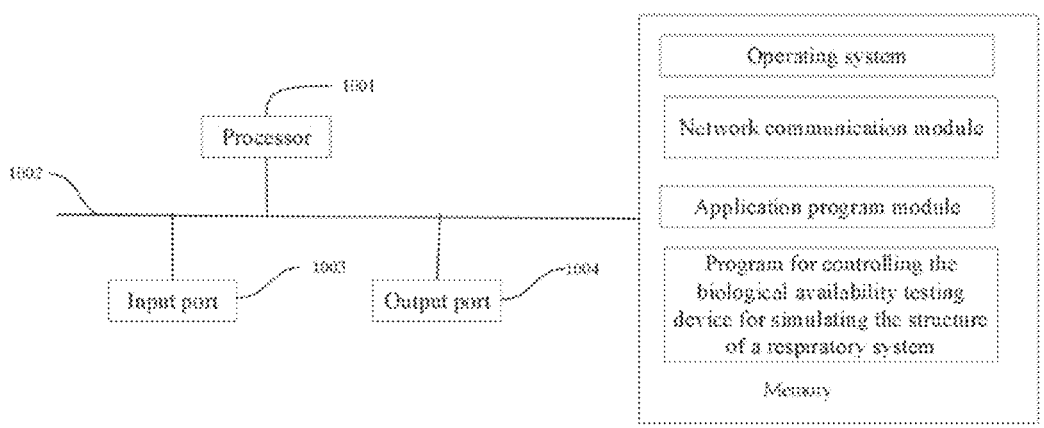

As shown in FIG. 8, the control equipment for the biological availability testing device for simulating the structure of a respiratory system includes: a processor 1001 (such as Central Processing Unit, CPU), a communication bus 1002, an input port 1003, an output port 1004, and a memory 1005. Among them, the communication bus 1002 is used to achieve connection communication between these components; the input port 1003 is used for data input; and the output port 1004 is used for data output, and the memory 1005 can be high-speed RAM memory or non volatile memory, such as disk memory, non-transitory computer-readable storage medium. Optionally, memory 1005 is a storage device independent of the aforementioned processor 1001.

The memory 1005, as a non-volatile readable storage medium, may include an operating system, network communication module, application program module, and a program for controlling the biological availability testing device for simulating the structure of a respiratory system. The network communication module is mainly used to connect to servers and communicate data with them; And processor 1001 is used to call the program to process the method stored in memory 1005, and execute all steps of the control method for a biological availability testing device for simulating a structure of a respiratory system mentioned above.

It should be noted that the control schemes corresponding to each historical dynamic variation trend are pre-designed by relevant technicians. By using an intelligent matching algorithm, control schemes of the temperature controller of the respiratory and the temperature controller of the lung can be quickly matched, which improves system operating speed and response time, thus maintaining the stability of the simulated respiratory environment.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A biological availability testing device for simulating a structure of a respiratory system, wherein, comprising a respiratory pump, a diaphragm, a lung model, alveolar components, an upper respiratory tract, an inhalation component, a mucus replenishment device, a vibration cleaning device, a sealed chamber, a temperature controller of respiratory, and a temperature controller of lung;
  wherein, the diaphragm is provided with a one-way valve, and the sealed chamber is divided into an upper region and a lower region by the diaphragm; and
  the lung model is connected to the alveolar components, and the lung model and alveolar components are located in the upper region of the sealed chamber; and
  a lung fluid injection/extraction connection pipeline of the alveolar components is connected to a sidewall of the sealed chamber; and
  the upper respiratory tract is communicated with the lung model and connected to the inhalation component; and
  the respiratory pump is communicated with the lower region of the sealed chamber; and
  a structure of the temperature controller of respiratory is the same with that of the temperature controller of lung, comprising a heating element, a humidifier, a temperature and humidity sensor, and a control circuit; the temperature controller of respiratory and the temperature controller of lung are configured to adjust a temperature and a humidity within a respiratory tract according to environmental parameters and a circadian rhythm of a human body, to maintain a simulated human respiratory environment;
  wherein the upper respiratory tract comprises two working stages: an inhalation-only stage and a breathing simulation stage, wherein the respiratory pump is configured to perform an inhalation process, and a one-way valve is opened during the inhalation-only stage; the one-way valve is closed in the breathing simulation stage, and the respiratory pump is configured to change an air pressure of the lower region, to alter a lung pressure to simulate breathing;
  wherein the upper respiratory tract is provided a double layer structure: a smooth layer and a porous material layer, an outer layer is the smooth layer, and an inner layer is the porous material layer; upper respiratory tract is configured to adhere and evenly distribute mucus;
  the vibration cleaning device is configured to remove adhered particulate matters.

2. The biological availability testing device for simulating the structure of the respiratory system according to claim 1, wherein the biological availability testing device further comprises a mucus replenishment device, and the mucus replenishment device is configured to periodically replenish mucus to maintain an integrity of a mucus layer.

3. The biological availability testing device for simulating the structure of the respiratory system according to claim 1, wherein each alveolar component comprises a porous upper end cap, a sealing ring, a breathable partition, a porous lower end cap, a lung fluid loading area, a lung fluid inlet and outlet pipe, an alveolar duct, a connecting tube of lung, a spherical connection part, and a catheter.

4. The biological bioavailability testing device simulating the structure of the respiratory system according to claim 1, wherein a structure of the inhalation component is a four channel structure, and two channels of the inhalation component are configured to link nasal and oral cavities, and other two channels of the inhalation component is configured to serve as a main channel and an auxiliary channel respectively; and the main channel is equipped with a particle concentration detector and a flowmeter, and the auxiliary channel is equipped with a filter membrane to collect samples.

5. The biological bioavailability testing device simulating the structure of the respiratory system according to claim 1, wherein the biological availability testing device further comprises a temperature and humidity sensor, configured to monitor values of temperature and humidity in real-time; and
- a central control system, configured to receive data from the temperature and humidity sensor, and adaptively adjust the values of the temperature and humidity based on preset conditions or real-time data; and
- an adaptive adjustment mechanism, which comprises a heating portion, a cooling portion, a humidifying portion, and a dehumidifying portion;
- wherein the adaptive adjustment mechanism is configured to adjust the values of temperature and humidity inside the biological bioavailability testing device according to commands from the central control system; the adaptive adjustment mechanism is also configured to simulate diurnal and seasonal temperature and humidity variation curves to replicate the conditions of a human respiratory tract under different times and environmental settings.

6. A control method for a biological availability testing device for simulating a structure of a respiratory system, applied to the biological availability testing device for simulating the structure of the respiratory system of claim 1, wherein comprising the following steps:
- acquiring real-time environmental parameters inside the biological availability testing device during a preset time period, and performing a feature extraction on the each real-time environmental parameters to obtain parameter features of each real-time environmental parameters, wherein the environmental parameters comprise values of temperature and humidity; and
- calculating Laplace scores between the parameter features and preset features, and selecting the parameter features with corresponding Laplace score greater than a preset score as a root node; and
- performing a splitting process on the root nodes based on the parameter features of each real-time environmental parameters to obtain several leaf nodes; after the splitting process, obtaining feature information gain for each leaf node, and comparing the feature information gain of each leaf node with a preset threshold value; if the feature information gain of any leaf nodes is not greater than the preset threshold, the splitting process continues; and
- stopping the splitting process when the feature information gain of all of the leaf nodes is greater than the preset threshold, assigning each real-time environmental parameter to a corresponding leaf node to obtain several initial clusters, and evaluating and adjusting the initial clusters to obtain a final clustering result; and
- constructing a Markov model and training the Markov model to obtain a trained Markov model, then importing the final clustering result into the trained Markov model for prediction to obtain a predicted dynamic variation trend of environmental parameters inside the biological availability testing device for a future time period.

7. The control method for the biological availability testing device for simulating the structure of the respiratory system according to claim 6, wherein further comprising the following steps:
- constructing a preset dynamic variation curve of the environmental parameters inside the biological availability testing device during a testing process according to preset human circadian rhythmic humidity test requirements; and
- constructing a predicted dynamic variation curve of the environmental parameters inside the biological availability testing device for a future time period based on the predicted dynamic variation trend; and
- calculating an overlap degree between the preset dynamic variation curve and the predicted dynamic variation curve using an Euclidean distance algorithm, and determining whether the overlap degree is greater than a preset overlap degree; and
- if the overlap degree is greater than the preset overlap degree, no control is performed on a temperature controller of respiratory and a temperature controller of lung; and
- if the overlap degree is not greater than the preset overlap degree, importing the predicted dynamic variation curve into the pre-constructed knowledge graph for pairing, to obtain a control scheme; controlling the temperature controller of respiratory and the temperature controller of lung based on the control scheme.

* * * * *